(12) United States Patent
Morales

(10) Patent No.: US 11,727,233 B1
(45) Date of Patent: Aug. 15, 2023

(54) METHODS AND PRINTING SYSTEM FOR INTELLIGENT OFFLINE INK ESTIMATION

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/701,252

(22) Filed: Mar. 22, 2022

(51) Int. Cl.
  *G06K 15/02* (2006.01)
  *G06F 3/12* (2006.01)

(52) U.S. Cl.
  CPC ....... *G06K 15/1823* (2013.01); *G06F 3/1208* (2013.01); *G06F 3/1229* (2013.01); *G06F 3/1237* (2013.01); *G06F 3/1296* (2013.01); *G06K 15/1836* (2013.01)

(58) Field of Classification Search
  CPC ............ G06K 15/1823; G06K 15/1836; G06F 3/1208; G06F 3/1229; G06F 3/1237; G06F 3/1296
  See application file for complete search history.

(56) References Cited

U.S. PATENT DOCUMENTS

| 11,157,219 | B1 | 10/2021 | Morales |
| 11,262,959 | B1* | 3/2022 | Morales ............. G06K 15/1877 |
| 2008/0137914 | A1* | 6/2008 | Minhas .................... G06T 7/001 382/112 |
| 2013/0101328 | A1 | 4/2013 | Morovic et al. |
| 2014/0233055 | A1 | 8/2014 | Eizenberg et al. |
| 2021/0271440 | A1* | 9/2021 | Segawa ................. G06F 3/1215 |

* cited by examiner

*Primary Examiner* — Juan M Guillermety
(74) *Attorney, Agent, or Firm* — Millen, White, Zelano & Branigan, P.C.; William Nixon

(57) ABSTRACT

A printing system includes an offline estimation device that provides estimates for ink or toner use for a print job at a target printing device. The offline estimation device retrieves digital front end (DFE) version information, configuration setting information, and color printing resources from the target printing device. Using the DFE version information, the offline estimation device selects a raster image processor (RIP) from a plurality of RIPs of software versions available within the printing system. The offline estimation device configures the RIP with configuration settings of the configuration setting information. The color printing resources also are pushed to the RIP. The offline estimation device provides the ink or toner use estimate using the configured RIP.

19 Claims, 11 Drawing Sheets

METHODS AND PRINTING SYSTEM FOR INTELLIGENT OFFLINE INK ESTIMATION

FIELD OF THE INVENTION

The present invention relates to a printing system and associated methods to provide intelligent offline ink estimation for a print job.

DESCRIPTION OF THE RELATED ART

Production printing operations typically involve ink or toner estimation. For large print jobs of 1000s or more documents, the ink and toner use can be considerable. Accurate estimates become important to adequately price the print jobs. Two ways may be used to estimate ink or toner use. One is inline with the digital front end (DFE) of the printing device. The DFE raster image processes the print job in the raster image processor (RIP) to estimate the ink and toner use. An offline process also may be used. An estimation application provides the estimates. Depending on the type, the estimation application will either look at the colors in a job file for the print job and estimate ink or toner use or it will raster image process the file offline to estimate ink or toner use.

These processes are not without drawbacks. If one estimates in the DFE, then the operator has to do the estimation. This task takes away time from production printing and, more importantly, makes it impossible for sales to gather this information in a timely manner. For offline estimation, one will estimate using image data from the portable document format (PDF). This process involves performing all color conversion and printing the job without modifying the colors. Such a process may not be possible because it does not consider factors like device calibration. It also requires that the operator not use any of the device color management, which is a drawback. Alternatively, one will estimate using an offline RIP. The RIP, however, just rasterizes the content. Thus, it also may have these problems as well as being more problematic if the color conversion does not exactly match the device.

SUMMARY OF THE INVENTION

A method for estimating use of consumables for printing operations at a device. The method includes selecting a target printing device to receive a print job. The method also includes retrieving digital front end (DFE) information and configuration settings information from the target printing device. The method also includes selecting a raster image processor (RIP) based on the DFE information from the target printing device. The RIP is one of a plurality of RIPs available at the device. The method also includes configuring the RIP with the configuration setting information form the target printing device. The method also includes estimating an amount of consumables for the print job using the configured RIP.

A device within a printing system is disclosed. The device includes a processor. The device also includes a memory connected to the processor. The memory includes instructions stored therein which configure the processor to select a target printing device to receive a print job. The processor also is configured to retrieve digital front end (DFE) information and configuration setting information from the target printing device. The processor also is configured to select a raster image processor (RIP) based on the DFE information from the target printing device. The RIP is one of a plurality of RIPs available at the device. The processor also is configured to configure the RIP with the configuration setting information from the target printing device. The processor also is configured to estimate an amount of consumables for a print job using the configured RIP.

A method for estimating use of consumables for printing operations at a device is disclosed. The method includes selecting a target printing device to receive a print job. The method also includes retrieving digital front end (DFE) information from the target printing device. The method also includes identifying color printing resources for the target printing device. The method also includes selecting a raster image processor (RIP) based on the DFE information from the target printing device. The RIP is one of a plurality of RIPs available at the device. The method also includes providing the color printing resources to the RIP. The method also includes estimating an amount of consumables for the print job using the RIP.

A method for estimating use of consumables for printing operations is disclosed. The method includes retrieving digital front end (DFE) information from a target printing device. The DFE information includes print engine model information. The method also includes determining a plurality of raster image processors (RIPs) available for the target printing device. The method also includes selecting a raster image processor (RIP) from the plurality of RIPs based on the print engine model information. The method also includes configuring the RIP with configuration setting information based on the print engine model information. The method also includes estimating an amount of consumables for the print job using the configured RIP.

A method for estimating use of consumables for printing operations is disclosed. The method includes retrieving digital front end (DFE) information and configuration setting information from a target printing device. The configuration setting information includes a default setting for the target printing device. The method also includes selecting a raster image processor (RIP) based on the DFE information from the target printing device. The RIP is one of a plurality of RIPs available at the target printing device. The method also includes configuring the RIP with the default setting for the target printing device. The method also includes estimating an amount of consumables for the print job using the configured RIP.

A method for estimating use of consumables for printing operations is disclosed. The method includes retrieving digital front end (DFE) information from a target printing device. The method also includes selecting a queue within the target printing device to receive a print job. The method also includes retrieving configuration setting information associated with the queue. The method also includes selecting a raster image processor (RIP) based on the DFE information from the target printing device. The RIP is one of a plurality of RIPs available at the target printing device. The method also includes configuring the RIP with a default color processing setting of the configuration setting information. The method also includes estimating an amount of consumables for the print job using the configured RIP.

A method for estimating use of consumables for printing operations is disclosed. The method includes retrieving digital front end (DFE) information from a target printing device. The method also includes selecting a queue within the target printing device to receive a print job. The queue includes setting information. The method also includes selecting a raster image processor (RIP) based on the DFE information from the target printing device. The RIP is one of a plurality of RIPs available at the target printing device.

The method also includes configuring the RIP with the setting information from the queue. The method also includes estimating an amount of consumables for the print job using the configured RIP.

A method for estimating use of consumables for printing operations is disclosed. The method includes selecting a target printing device to receive a print job. The method also includes retrieving digital front end (DFE) information from the target printing device. The method also includes selecting a raster image processor (RIP) from a plurality of RIPs at an offline estimation device based on the DFE information from the target printing device. The RIP includes a rendering component and a color conversion component. The method also includes requesting configuration setting information and color conversion settings from the DFE based on the print job. The method also includes receiving the configuration setting information and the color conversion settings at the offline estimation device. The method also includes configuring the rendering component of the RIP with the configuration setting information and applying the color conversion settings to the color conversion component. The method also includes estimating an amount of consumables for the print job using the RIP.

A method for estimating consumables for printing operations is disclosed. The method includes selecting a target printing device to receive a print job. The method also includes retrieving digital front end (DFE) information from the target printing device. The method also includes selecting a raster image processor (RIP) from a plurality of RIPs at an offline estimation device based on the DFE information from the target printing device. The method also includes sending a proxy print job to the DFE. The proxy print job includes print ticket information for the print job. The method also includes processing the proxy print job at the DFE to determine configuration setting information and color conversion settings for the proxy print job. The method also includes receiving the configuration setting information and the color conversion settings at the offline estimation device. The method also includes configuring the RIP with the configuration setting information and the color conversion settings. The method also includes estimating an amount of consumables for the print job using the RIP.

A consumable estimation system for printing operations is disclosed. The system includes a digital front end (DFE) of a target printing device. The DFE includes DFE information. The DFE is configured to receive a proxy print job. The DFE also is configured to generate configuration setting information and color conversion settings for the proxy print job. The system also includes an offline estimation device connected to the DFE. The offline estimation device receives a print job for the target printing device. The offline estimation device is configured to select a raster image processor (RIP) from a plurality of RIPs available to the DFE of the target printing device. The offline estimation device also is configured to send the proxy print job corresponding to the print job to the DFE. The offline estimation device also is configured to receive the configuration setting information and the color conversion settings for the proxy print job from the DFE. The offline estimation device also is configured to configure the RIP with the configuration setting information and the color conversion settings. The offline estimation device also is configured to estimate an amount of consumables for the print job using the RIP and the color conversion settings.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
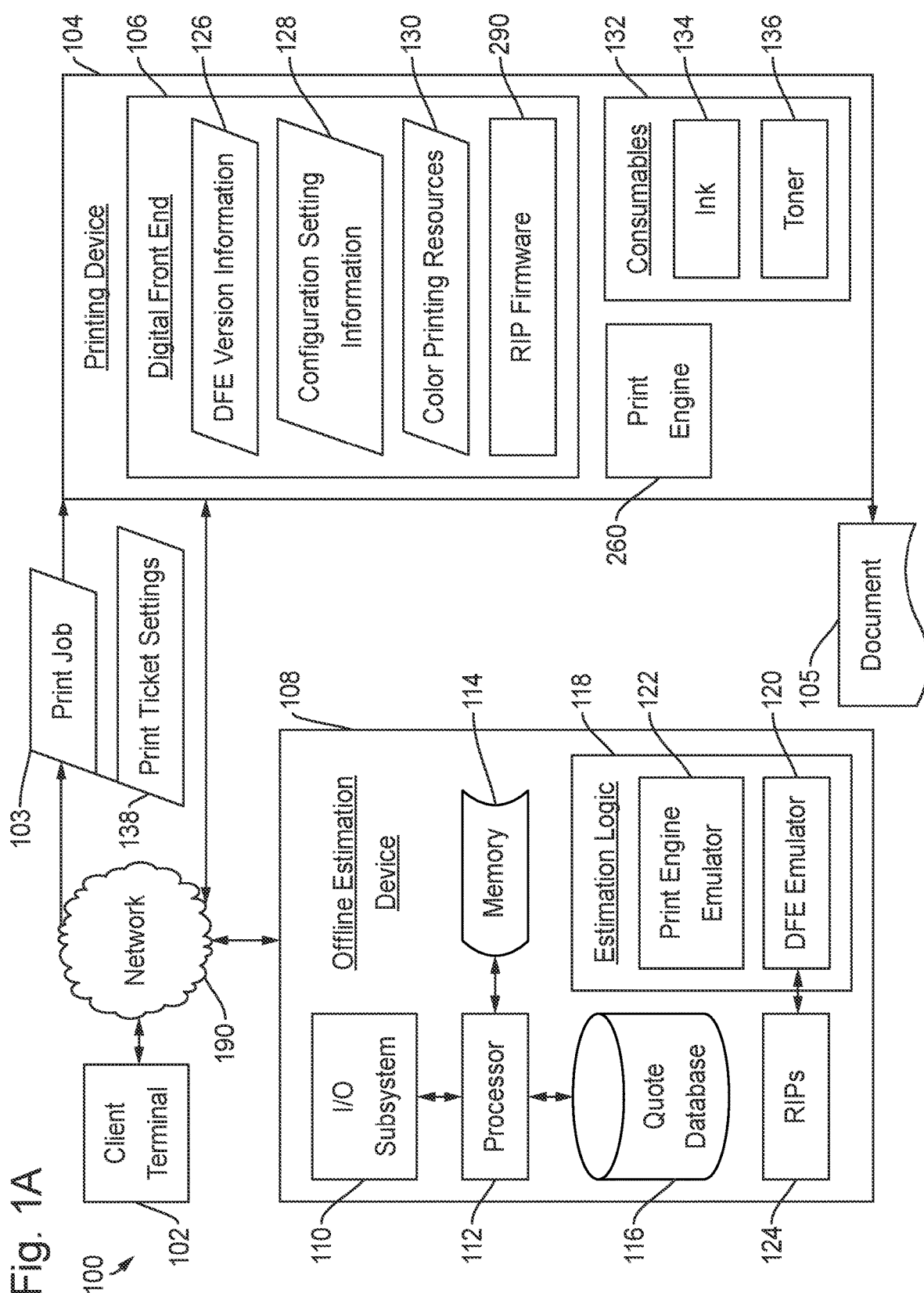
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments enable ink and toner use estimation without the limitations of current offline ink and toner use estimation systems. In the following detailed description, the term ink may be used, which also include toner. Ink may be referred to as a liquid and used in volume while toner may be referred to as a powder and used in weight. For brevity, the detailed description may refer to "ink" which also refers to toner. These terms may be used interchangeably throughout the present specification.

The disclosed ink use estimation processes may operate by the operator selecting a job file, document, file, and the like to use for ink use estimation. The operator selects a printing device as a target to use as the target for ink use estimation. At this point, the operator may define the print settings, or print ticket settings. For example, the operator may specify that the ink use estimate be provided for a print job using draft quality versus normal quality. Another example is having the document printed on both sides of the sheets as opposed to one side only.

The disclosed embodiments enable a device to manage ink use estimation. The device may be a server connected to the target printing device. The device would be offline in that it may not be connected to a network at all times or even to the target printing device. The device retrieves the following information from the printing device:

DFE version information,

Printing device configuration settings that affect ink use, such as configured print merging, inkjet purge options, or elevation settings, Paper catalog and paper groups, Calibrations, ICC profiles, and RIP configuration settings such as spot color processing.

Other information and settings may be retrieved from the DFE.

In order to estimate ink use, the disclosed embodiments, using the device, determine the DFE software version and select a RIP that has the same version. The device does not include just one RIP but many different RIPs. Preferably, there is a RIP for each software version that has been released. The device automatically configures the RIP using the retrieved printing device configuration settings. Unlike other ink use estimation systems, the disclosed embodiments enable the configuration to be done in realtime and enables different RIP instances to use different printing device configurations. The RIP will use these settings to adjust how the print job is "RIPped" or rendered. The disclosed embodiments also adjust how ink consumption is calculated from the RIPped image data.

The disclosed embodiments push the resources to the RIP so that it matches the printing device's configuration. These resources include paper catalogs and paper groups, calibrations, and ICC profiles. Once the RIP is configured, the disclosed embodiments perform ink use estimation per currently available implementations. After ink use calculation, the disclosed embodiments may further extend any verified production to include not just printing device settings but also to include print ticket settings that impact ink use, such as those listed above.

The disclosed embodiments ensure that the offline RIP ink use calculation is done in a manner that matches the target printing device for ink use calculation. This process may be related to intelligent ink use estimation.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client devices 102.

Printing device 104 receives print jobs through printing system 100. It may receive print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 102. DFE 106 may be disclosed in greater detail in FIG. 1B. In addition to the components of DFE 106 disclosed in FIG. 1B, it also includes various information that may be of use for ink use estimation. This information includes DFE version information 126, configuration setting information 128, and color printing resources 130. DFE 106 also includes RIP firmware 290, disclosed in greater detail below.

Printing device 104 also includes consumables 132. Consumables 132 may relate to items at or within printing device 104 but are not actually part of the printing device itself. Consumables 132, however, are used in printing operations. Consumables 132 include ink 134 and toner 136. Ink 134 and toner 136 further may be broken into different colorant inks. For example, ink 134 may include cyan ink, magenta ink, yellow ink, and black ink. If printing device 104 is not capable of color printing, then ink 134 may include only black ink. Printing device 104 may include other consumables 132, such as sheets, that are not disclosed in detail herein.

Print job 103, when printed on printing device 104, uses an amount of consumables 132 to produce document 105. In some embodiments, print job 103 produces thousands or more of a document. Thus, the amount of consumables used for print job 103 may be considerable. As disclosed above, printing system 100 may need to provide an estimate for the use of consumable 132. The estimate determined for print job 103 may depend on various settings of printing device 104. The settings as well as print ticket settings 138 associated with print job 103 impact the amount of consumables 132 used to generate document 105.

For example, DFE 106 may use RIP firmware 290 to convert bitmap images, vector graphics, fonts, and the like associated with pages in print job 103 to bitmap/rasterized representations of the pages, such and C, M, Y, and K pixels. The sum of the values of pixels of a particular color in the rasterized pages can be proportional to the amount of consumables 132 used by printing device 104 to print that color. RIP firmware 290 may rasterize pages of print job 103 according to various image rasterization settings, as captured by configuration setting information 128. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, spot color processing, overprint, knockout, and the like.

To lower printing device consumable usage, RIP firmware 290 may be configured via image rasterization parameters of configuration setting information 128 to reduce the density for each colorant, convert color images to black and white, and adjust tone reproduction curves (TRCs) to lower printing device use of consumables 132. Gray component replacement levels may be adjusted via configuration setting information 128. Color printing resources 130 may be configured to change how colors are converted for printing to thereby reduce usage of consumables 132.

The disclosed embodiments also include an offline estimation device 108 that includes estimation logic to facilitate performance of ink use estimation. Offline estimation device 108 may include estimation logic 118 having a DFE emulator 120 and a print engine emulator 122 configured to emulate operations performed by DFE 106 and print engine 260 of printing device 104. Print engine 260 is disclosed in greater detail below. DFE emulator 120 and print engine emulator 122 may be configured with configuration setting information 128 to match settings associated with printing device 104. Estimation logic 118 also may be configured to estimate the amount of consumables 132 to process print job 103 and produce document 105.

In operation, estimation logic 118 may monitor information and settings of printing device 104 to determine any differences from previous estimates. This feature facilitates real-time configuration information for DFE 106, RIP firmware 290, or print engine 260 with the corresponding settings utilized by printing device 104.

Printing device 104 may include other settings within configuration setting information 128, such as printing device maintenance settings that may control or impact head cleaning intervals, head clogging prevention intervals, spitting, or printing spray patterns over all content, the printing of purge sheets or inkjet purge options, the printing of spit lines, or lines printed between page frames in a roll-fed printing device to ensure that all jets of the print head fire accordingly, and the like.

Offline estimation device 108 may be any device within system 100 and connected to network 190 to receive and send data to printing device 104. Offline estimation device 108 also may be connected to other printing devices within system 100. Preferably, offline estimation device 108 may be server. It also may be another device, such as a computer. Offline estimation device 108 includes a memory 114 and a processor 112. Offline estimation device 108 also includes an input/output (I/O) subsystem 110 and a quote database 116.

Offline estimation device 108 also may refer to consumable estimation software that executes on a device. As disclosed below, "offline estimation device" may refer to this software.

Processor 112 is in communication with memory 114. Processor 112 is configured to execute instruction code in memory 114. The instruction code controls offline estimation device 108 to perform various operations for estimating consumables 132 that may be used by printing device 104. Processor 112 may be a computer processing unit that executes the instruction code in memory 114.

I/O subsystem 110 may include one or more input, output, or input/output interfaces that are configured to facilitate communications with other devices within system 100, such as client terminal 102 and printing device 104. An example of I/O subsystem 110 may be configured to dynamically determine the communication methodology utilized by entities of system 100 to communication information thereto. For example, I/O subsystem 110 may determine that a first entity utilizes a RESTful API and can, as a result, communicate with the entity using an interface that uses a RESTful communication methodology.

Estimation logic 118 is implemented within offline estimation device 108 to estimate the amount of consumables 132 to be used by printing device 104 for printing document 105 of print job 103. Estimation logic 118 includes DFE emulator 120 and print engine emulator 122, as disclosed above. DFE emulator 120 and print engine emulator 122 are configured with configuration setting information 128 to match the settings and parameters of printing device 104.

DFE emulator 120 may be configured to emulate operations performed by DFE 106 of printing device 104. The emulation depends on various settings specified for printing device 104. For example, DFE emulator 120 may be configured to convert bitmap images, vector graphics, fonts, and the like specified in sample pages of print job 103 to bitmap/rasterized representations of the pages using C, M, Y, and K pixels. The manner in which DFE emulator 120 performs the conversion may depend on various image rasterization settings of the DFE emulator, which correspond to the image rasterization settings of DFE 106.

In some embodiments, DFE emulator 120 retrieves a RIP of the plurality of RIPs 124 available at offline estimation device 108. Selection of the appropriate RIP provides a better basis to estimate ink use. For example, estimation logic 118 may determine the DFE software version from DFE version information 126 to select a RIP that has the same version. Offline estimation device 108 includes many different RIPs 124. Preferably, it includes one for each software version that has been released. DFE emulator 120 may automatically configure the selected RIP using configuration settings from configuration setting information 128. The configuration of the RIP is enabled in real time and for different RIP instances.

The RIP configured by offline estimation device 108 may use these settings to adjust how print job 103 is image processed and also to adjust how consumables 132 is calculated from the rasterized image data. Estimation logic 118 also may push color printing resources 130 to the selected RIP of RIPs 124 so that it matches the printing device's configuration. Once the RIP is configured, offline estimation device 108 may perform ink use estimation. After the estimation is complete, offline estimation device 108 may verify production by comparing the consumable estimate to a previous estimate. This process would not just include printing device settings but also includes print ticket settings 138 that impact ink use.

Figure 1B:
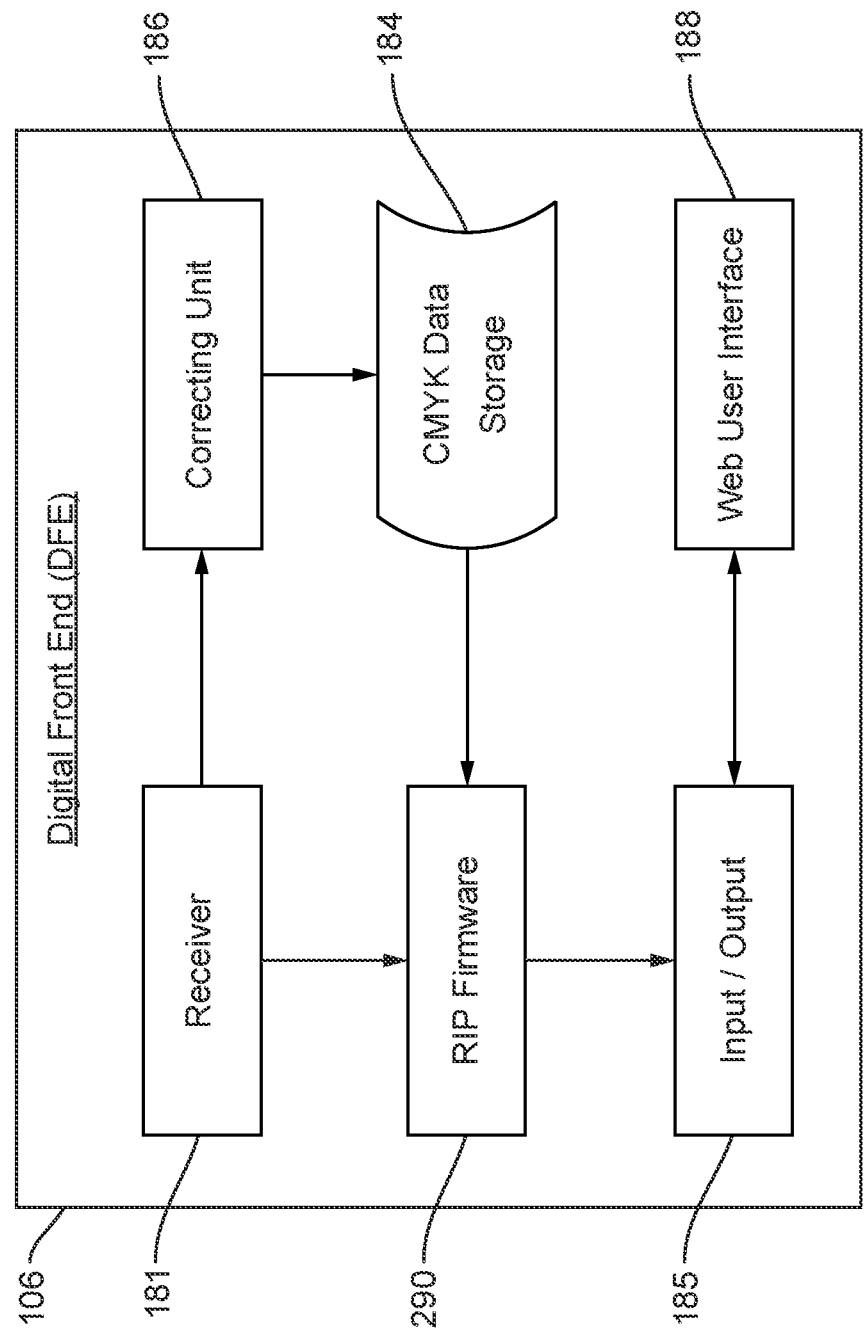
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for DFE version information 126 and configuration setting information 128, even though these are not shown in FIG. 1B.

Receiver 181 receives print job 102 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or offline estimation device 108, if it is located at a separate device, using, for example, input/output connector 185. Web user interface 188, or web application, allows a user of the DFEs of other printing devices to interact with content or software running on DFE 106.

Figure 2:
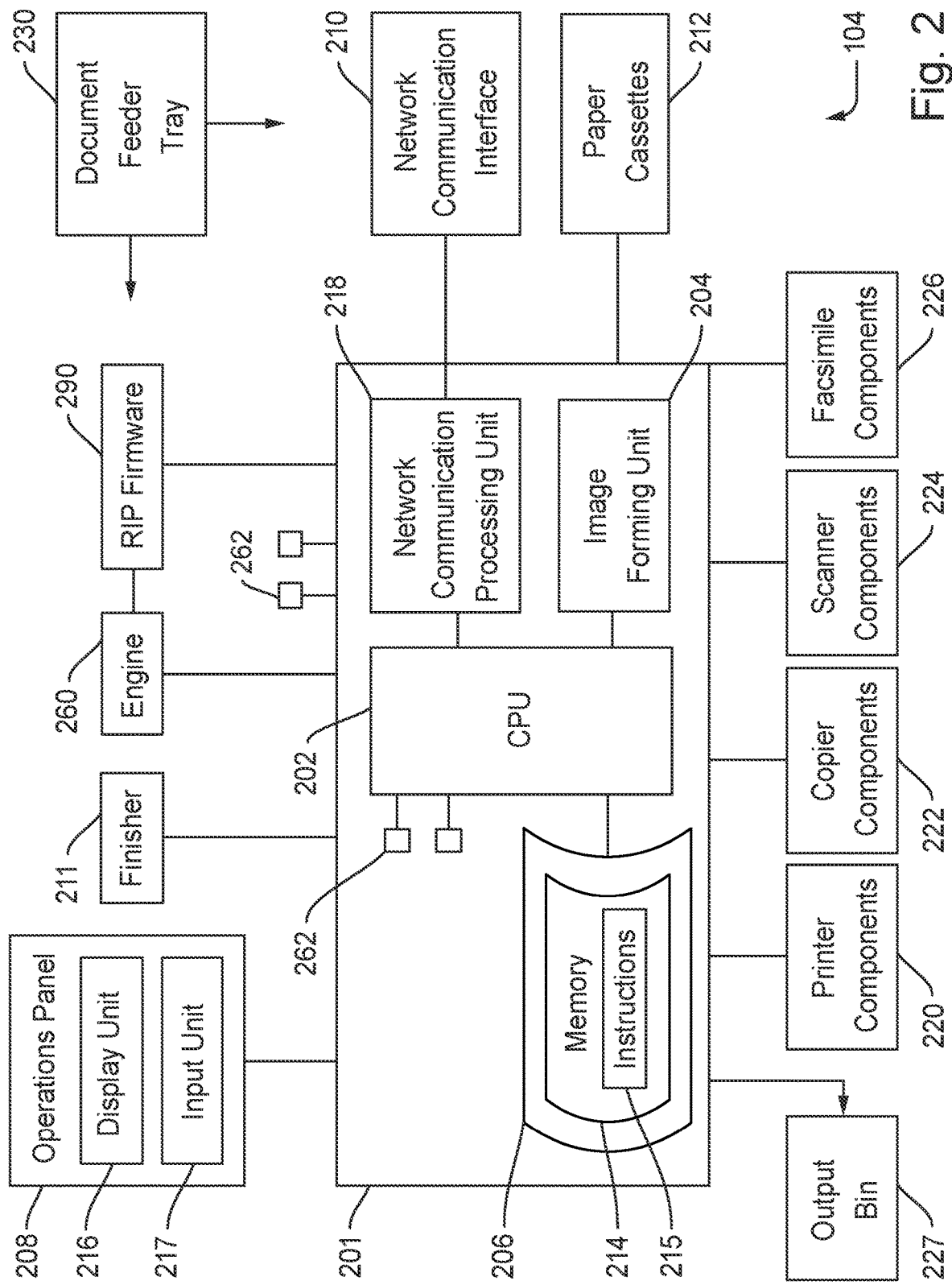
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from offline estimation device 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from offline estimation device 108, if applicable. Offline estimate device 108 may send ink use estimation data to printing device 104 for display. For example, the operator at printing device 104 may request an estimate for a received print job 103. Printing device 104 requests an estimate for consumables 132 according to the disclosed embodiments.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from offline estimation device 108 as well as other printing devices within system 100.

Figure 3:
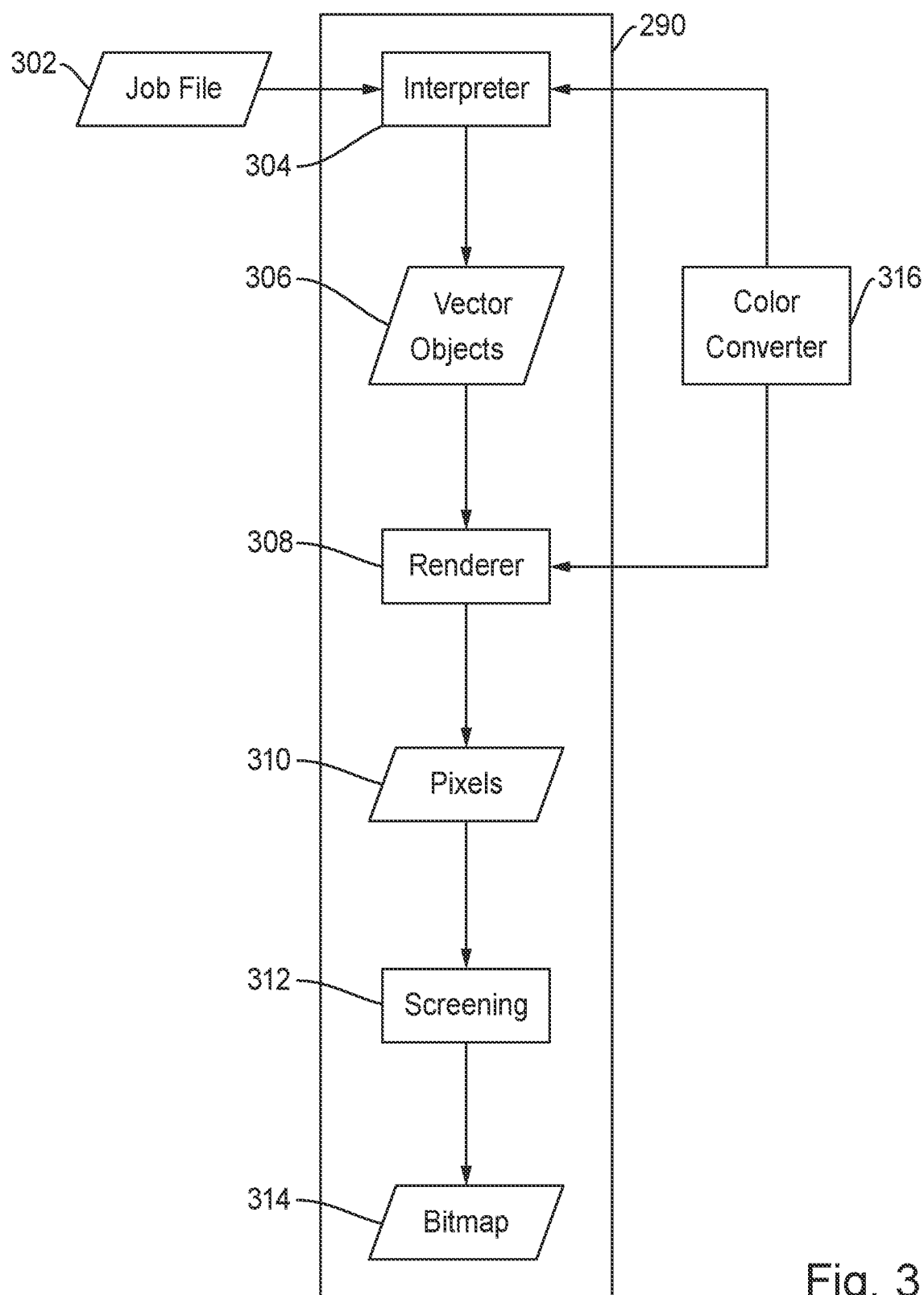
FIG. 3 illustrates a block diagram of RIP firmware used within the DFE according to the disclosed embodiments.

FIG. 3 depicts a block diagram of RIP firmware 290 used within DFE 106 according to the disclosed embodiments. RIP firmware 290 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP firmware 290 may provide interpretation, rasterization, and screening.

Job file 302 may be a job file associated with print job 103. Job file 302 may be a PostScript file in code. Job file 302 may be provided to RIP firmware 290 in DFE 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may comprise an image, a character of text, a fill, stroke, and the like and listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by print engine 260.

RIP firmware 290 also may implement color converter 316. Color converter 316 may implement the functions disclosed above with regard to color conversion. Color converter 316 provides color management and calibration. These actions may be applied during interpretation or rendering, depending on configuration and job content. Color printing resources 130 may be accessed to provide the color management.

RIP firmware 290 may have a software version or other identification associated with it that distinguishes this version from others in system 100. Printing device 104 may implement several different RIP firmware versions depending on the type of print job 103. Further, different printing devices may implement different versions of the RIP firmware. Preferably, RIP firmware 290 is software implemented.

Figure 4:
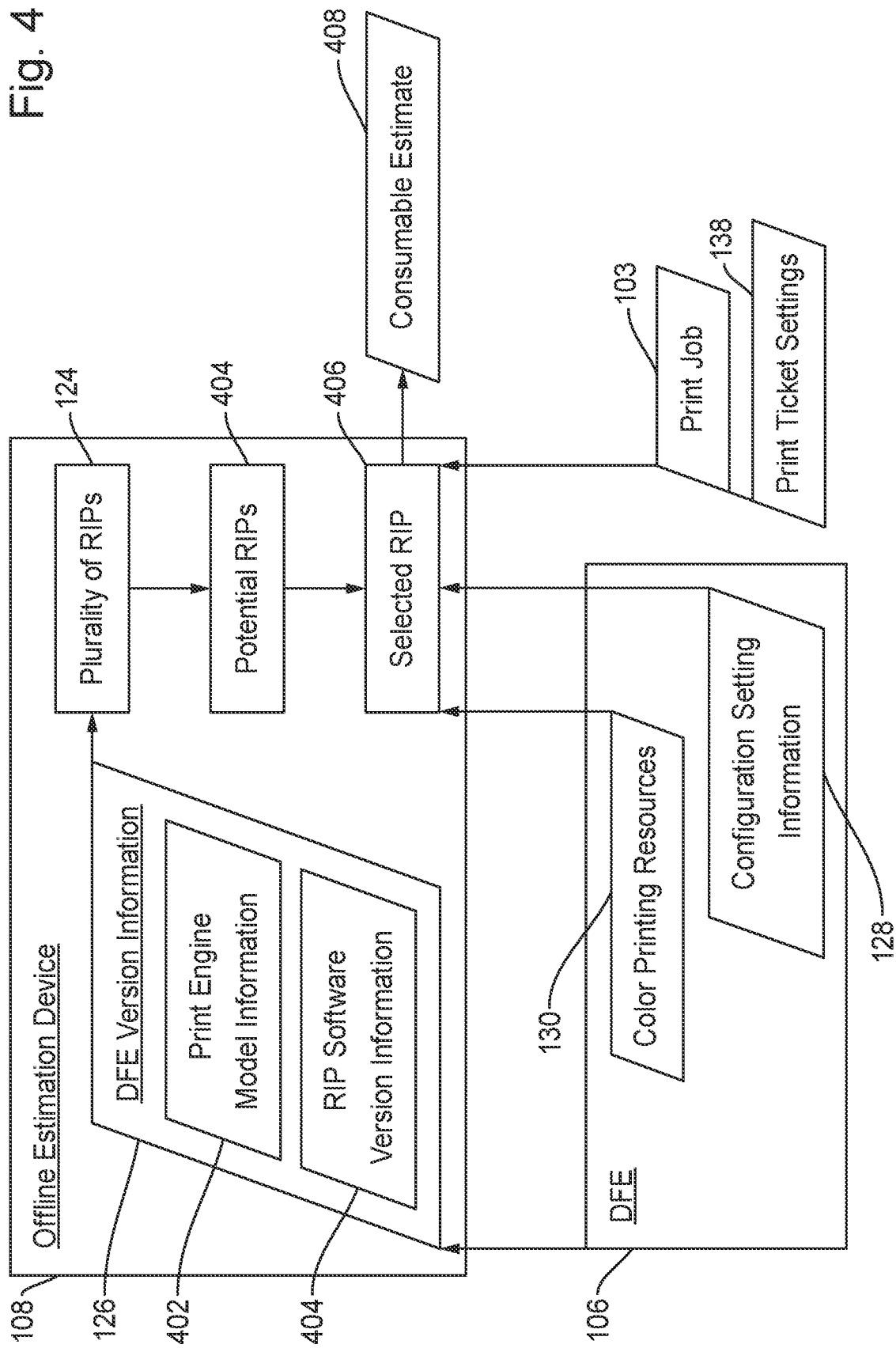
FIG. 4 illustrates a process flow diagram of the selection of a RIP from the plurality of RIPs in the offline estimation device according to the disclosed embodiments.

FIG. 4 depicts a process flow diagram of the selection of a RIP from the plurality of RIPs 124 in offline estimation device 108 according to the disclosed embodiments. Offline estimation device 108 should select the most appropriate version of the RIP to emulate RIP firmware 290 implemented in DFE 106 of printing device 104. DFE emulator 120 may use this selected RIP to perform estimation of consumables 132 at offline estimation device 108.

The operations disclosed by FIG. 4 may be implemented in offline estimation device 108. Offline estimation device 108 retrieves information about printing device in order to select the appropriate RIP to use in estimating consumable use. Preferably, offline estimation device 108 receives DFE version information 126 from DFE 106. This information includes print engine model information 402. Different printing devices may use different print engines for printing operations. These different print engines also may utilize different RIPs as well. Within the different RIPs used by the print engine, there may be different versions.

For example, DFE version information 126 may include RIP software version information 404 along with print engine model information 402. Offline estimation device 108 would select a RIP to match the print engine model and the exact version number. The disclosed embodiments may select between RIPs for different printing devices. For example, the disclosed embodiments may select the MZ8001ic RIP as opposed to the TASKalfaPro 15000c RIP based on print engine model information 402.

Within printing device 104, the disclosed embodiments also select the exact version of the RIP software, as specified by RIP software version information 404. For example, within printing device 104 may be a print engine 260 associated with the TASKalfaPro 15000c model. There may be five different software versions for this DFE that have been released to the market. The disclosed embodiments retrieve the version number from RIP software version information 404 to process the print job using the exact version that printing device 104 uses.

Using DFE version information 126, offline estimation device 108 queries plurality of RIPs 124 to generate potential RIPs 494. These potential RIPs may be the different software versions released for the specific printing device associated with the DFE print engine model information. Offline estimation device 108 includes many different RIPs and their different versions. Updates to the various RIPs deployed within system 100 may be received at offline estimation device 108 to make sure plurality of RIPs 124 are kept current. This feature also reduces the need to keep DFE 106 aware of updates to different RIPs that are not related to its RIP firmware 290.

Once potential RIPs are identified, offline estimation device 108 may use RIP software version information 404 to determine the exact version number of the RIP at printing device 104. Alternatively, the disclosed embodiments may use the exact version number of the RIP that is among a plurality of RIPs used as RIP firmware 290. Using this information, selected RIP 406 is determined from potential RIPs 494. In some embodiments, selected RIP 406 may be determined from plurality of RIPs 124 directly without the need for generating potential RIPs 494.

Selected RIP 406 is configured to mirror RIP firmware 290 in printing device 104 using configuration setting information 128. Offline estimation device 108 may automatically configure selected RIP 406 using the retrieved printing device configuration settings. The configuration settings within configuration setting information 128 is disclosed in greater detail below. Offline estimation device 108 also may retrieve color printing resources 130 provided from DFE 106. Selected RIP 406 may call upon color printing resources 130 while doing color printing. Color converter 316 may apply these resources to convert the data within the print job into colors applicable to printing device 104.

In order to provide the estimate, selected RIP 406 within offline estimation device 108 processes print job 103 much like RIP firmware 290. Selected RIP 406 also takes into account print ticket settings 138 for print job 103. As disclosed above, print ticket settings 138 may be settings specific to the print job, such as printing on both sides, specifying draft quality printing, and the like. In other words, print ticket settings 138 may differ between print jobs. Configured selected RIP 406 now can estimate the amount of consumables 132 that would be needed to complete print job 103. Configured selected RIP 406 provides consumable estimate 408 from offline estimation device 108. The estimate may be sent to other devices within system 100, such as client terminal 102 or printing device 104.

Figure 5:
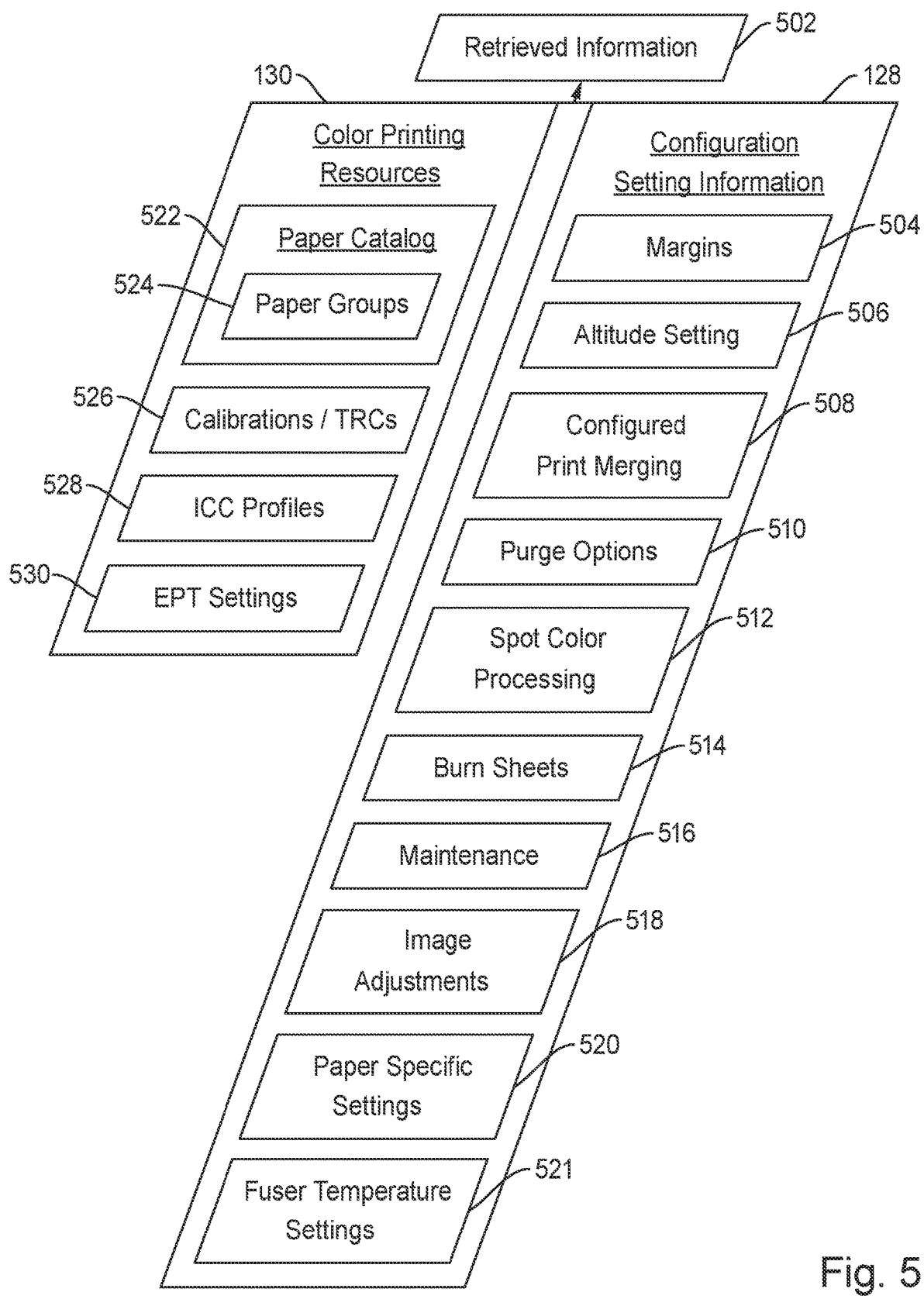
FIG. 5 illustrates a block diagram of configuration settings within the configuration setting information and the color printing resources retrieved by the offline estimation device according to the disclosed embodiments.

As can be appreciated, any number of configuration settings may be provided in configuration setting information 128 to adapt selected RIP 406 to mirror RIP firmware 290 of printing device 104. Examples of these configuration settings are shown in FIG. 5. The disclosed settings are not exhaustive and may include other settings retrievable from DFE 106 and printing device 104. It should be noted that selected RIP 406 includes components similar to RIP firmware 290 disclosed in FIG. 3.

FIG. 5 depicts a block diagram of configuration settings within configuration setting information 128 and color printing resources 130 retrieved by offline estimation device 108 according to the disclosed embodiments. Retrieved information 502 may represent the data provided by DFE 106 to offline estimation device 108. Selected RIP 406 is configured accordingly.

Configuration setting information 128 include printing device configuration settings that impact ink and toner use within printing device 104. These settings include margins 504 that are available on printing device 104. Margins 504 may be larger or smaller depending on the printing device and RIP firmware. Margins may be set as defaults or per print job. In addition, margins may be media dependent. For example, in printing device 104, larger paper sizes must use a 4 mm margin that is different than smaller paper sizes which may use margins between 1 and 4 mm. Further, media attributes may constrain margins. For example, certain sheets of specific media may require a minimum margin for printing operations. This information is typically model-specific and should be retrieved with configuration settings information 128.

Another configuration setting may be altitude, or elevation, setting 506. The elevation, for example, above sea level may impact ink use. Some inkjet printing devices include settings related to elevation that may be used to configure selected RIP 406. Using this example, printing device 104 may be configured for one of four different elevations: 0 to 1000 m, 1001 to 2000 m, 2001 to 3000 m, and above 3001 m. The heads may need to be changed depending on the altitude of printing device 104. Fuser temperature settings 521 also may be included as printing device specific settings. Fuser temperature settings may be applicable for toner devices, which may impact ink use. Again, maintenance within printing device 104 may depend on these temperature settings.

Configured print merging setting 508 may provide instructions used for print merging. Purge options 510 may represent how often inkjet heads are purged during operations. These actions impact ink use. During large production print jobs, a purge may need to occur during the print job and is part of the ink used to process the print job. Thus, these settings should be retrieved as well.

Spot color processing 512 may provide settings for spot color operations to determine the reproduction capability of printing device 104. Again, these may need to be run periodically during printing operations and possible more than once during large print jobs. Burn sheets 514 also are included. Burn sheets may be printed at specified intervals for more quality testing of printing device 104. These settings are printing device specific and may be done as needed or as specified. Selected RIP 406 is configured with these settings accordingly.

Maintenance settings 516 may related to maintenance on the print heads of printing device 104. These settings may relate to how head maintenance is done. For example, head maintenance may be done by printing purge sheets, as set forth in purge options 510, at specified intervals or by printing a pattern over all printed sheets that is invisible to the human eye. These operations ensure that all jets fire at regular intervals. These actions also impact ink use.

Image adjustments 518 are settings related to magnification adjustments, change dimensions of images, paper scaling, and change positions related to images or graphics within the print job. Printing device 104 may not be able to print an image accurately so that settings help adjust the image for printing. These also may impact ink use especially if print job 103 include any images. Paper specific settings 520 also are included in configuration setting information 128. Specific papers loaded onto printing device 104 may include their own settings or requirements that affect ink use. For example, ink use may be limited on a specific paper in order to prevent bleeding or over use of ink.

Configuration setting information 128 also may include default CMYK, default gray, and default RGB ICC profiles. It also may include default rendering intent and default simulation ICC profile. The operator may change these default color resources for printing device 104. For example, the default simulation profile may be changed from FOGRA51 to GRACoL 2013, which would impact image quality. In addition, these defaults may be overridden per print job as part of the job settings.

In addition to configuration setting information 128, retrieved information includes color printing resources 130 within DFE 106. These resources may be files stored at DFE 106 that are made available to selected RIP 406 in the event color printing is to take place for print job 103. Color printing resources 130 may not be applied in all instances of printing on printing device 104.

Color printing resources 130 includes paper catalog 522. Paper catalog 522 may be a paper database on DFE 106 that stores attributes of media stock available in the production print shop, or in system 100. Paper catalog 522 may define multiple media attribute combinations and assign unique names to each combination. It also may assign color profiles for each media. It also may select predefined media for submitted print jobs and assign the media to trays at printing device 104. Paper groups 524 also may be included within paper catalog 522. Paper groups 524 may be implicit (defined by the system based on rules) or explicit (defined by the operator).

Color printing resources also include calibrations/TRCs 526 and ICC profiles 528. These are resources to be used for color printing at printing device 104. Preferably, this information is specific to printing device 104. End point target settings 530 also may be used. Other settings include ink limits, total area coverage, and the like. All of these settings and resources impact ink use while processing a print job using RIP firmware 290, so these settings and resources are to be made available to selected RIP 406 within offline estimation device 108.

Figure 6:
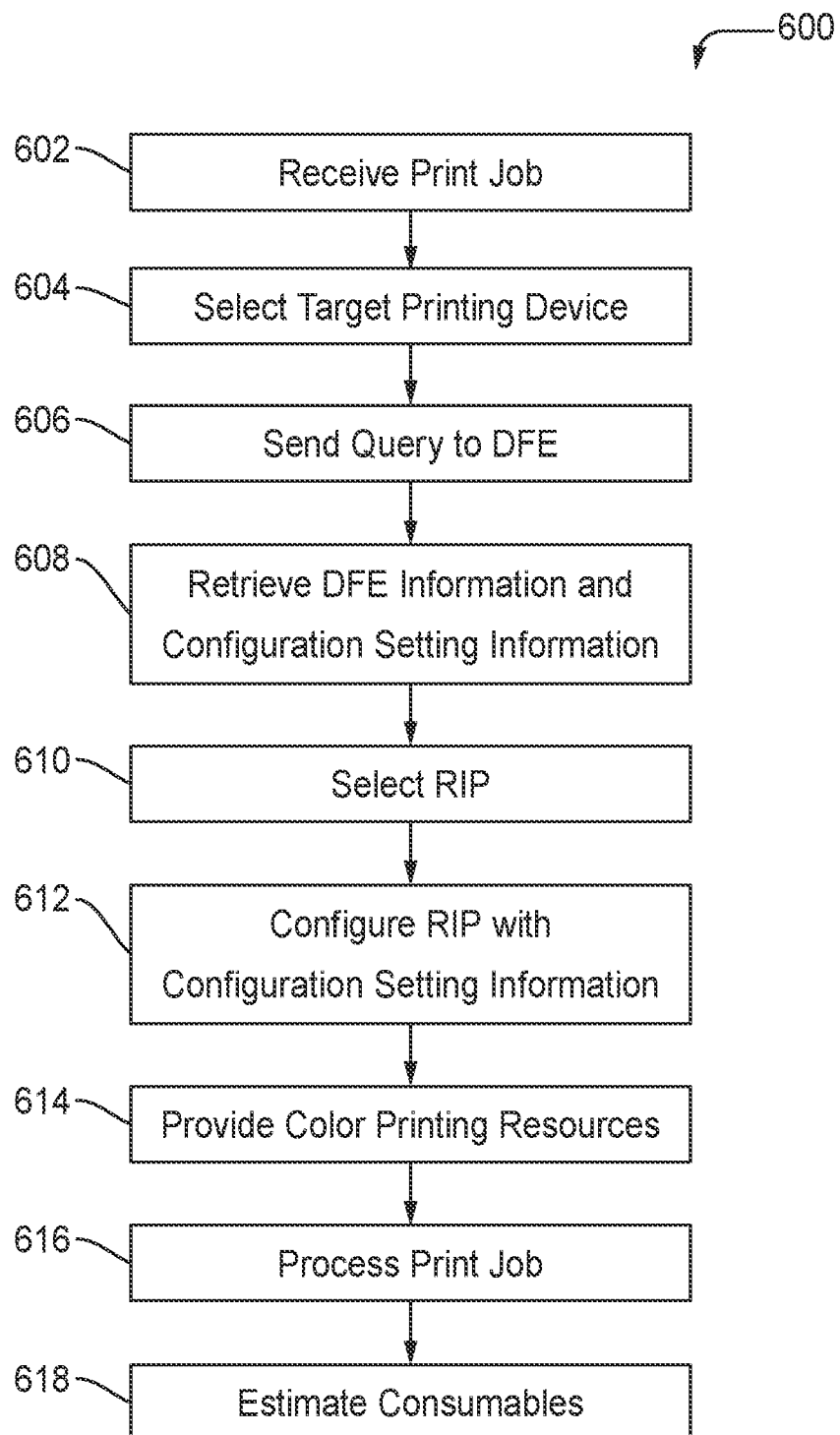
FIG. 6 illustrates a flowchart for estimating use of consumables for printing operations at a target printing device according to the disclosed embodiments.

FIG. 6 depicts a flowchart 600 for estimating use of consumables 132 for printing operations at a target printing device 104 according to the disclosed embodiments. Flowchart 600 may refer to FIGS. 1A-5 for illustrative purposes. Flowchart 600, however, is not limited to the embodiments disclosed by FIGS. 1A-5.

Step 602 executes by receiving print job 103. Print job 103 results in the printing of document 103. As disclosed above, print job 103 may result in 1000s or 100,000s or more of sheets being printed. Print job 103 may be submitted by client terminal 102 to system 100. It may be received for ink use estimation by offline estimation device 108. For example, a salesperson at a customer site may submit print job 103 to offline estimation device 108 before submitting the print job for printing at a printing device. Alternatively, print job 103 may be received at printing device 104. Print job 103 also may include print ticket settings 138, as disclosed above.

Step 604 executes by selecting a target printing device within system 100. For example, printing device 104 may be selected as the target printing device to process and print document 105 for print job 103. Step 606 executes by sending a query to DFB 106 for the information needed to configure a RIP for ink use estimation. The query may be sent by offline estimation device 108. DFE 106 receives the query and compiles the information requested as retrieved information 502.

Step 608 executes by retrieving DFE version information 126, configuration setting information 128, and color printing resources 130 from DFE 106 by offline estimation device 108. This information may be sent as retrieved information 502 over network 190. Step 610 executes by selecting a RIP 406 from plurality of RIPs 124 based on DFE version information 126. In some embodiments, DFE version information 126 may include print engine model information 402 that matches the print engine model at printing device 104. It also may include RIP software version information 404. RIP software version information 404 may be a version number for the applicable RIP software of RIP firmware 290. This information is used to select RIP 406 for the plurality of RIPs 124 available within system 100.

Step 612 executes by configuring selected RIP 406 with configuration setting information 128. As disclosed above, a number of configuration settings is provided by DFE 106. Selected RIP 406 is configured with these settings to match RIP firmware 290. In some embodiments, the match may be as close as possible. These settings will inform how selected RIP 406 will act when processing print job 103. Step 614 executes by providing color printing resources 130 to selected RIP 406. These resources are made available to selected RIP 406 when "processing" the print job. Selected RIP 406 may mimic RIP firmware 290 in actions taken to color print and how ink will be used to accomplish these actions.

Step 616 executes by processing print job 103 using print ticket settings 138 using selected RIP 406 within offline estimation device 108. The disclosed embodiments have this process act like print job 103 is being processed at DFE 106 using RIP firmware 290, but in a separate device so as to not tie up resources at DFE 106. Further, one does not have to directly access printing device 104 to obtain the ink use estimate. Print job 103 is processed as though it will be printed. Step 618 executes by estimating consumables 132 to print document 105 for print job 103. Offline estimation device 108 calculates the amount of ink 134 or toner 136 to print document 105 using the results provided by selected RIP 406 and the other components therein. The estimate may be provided to a user or an operator within system 100. For example, the consumable estimate may be sent to client terminal 102 or printing device 104.

Figure 7:
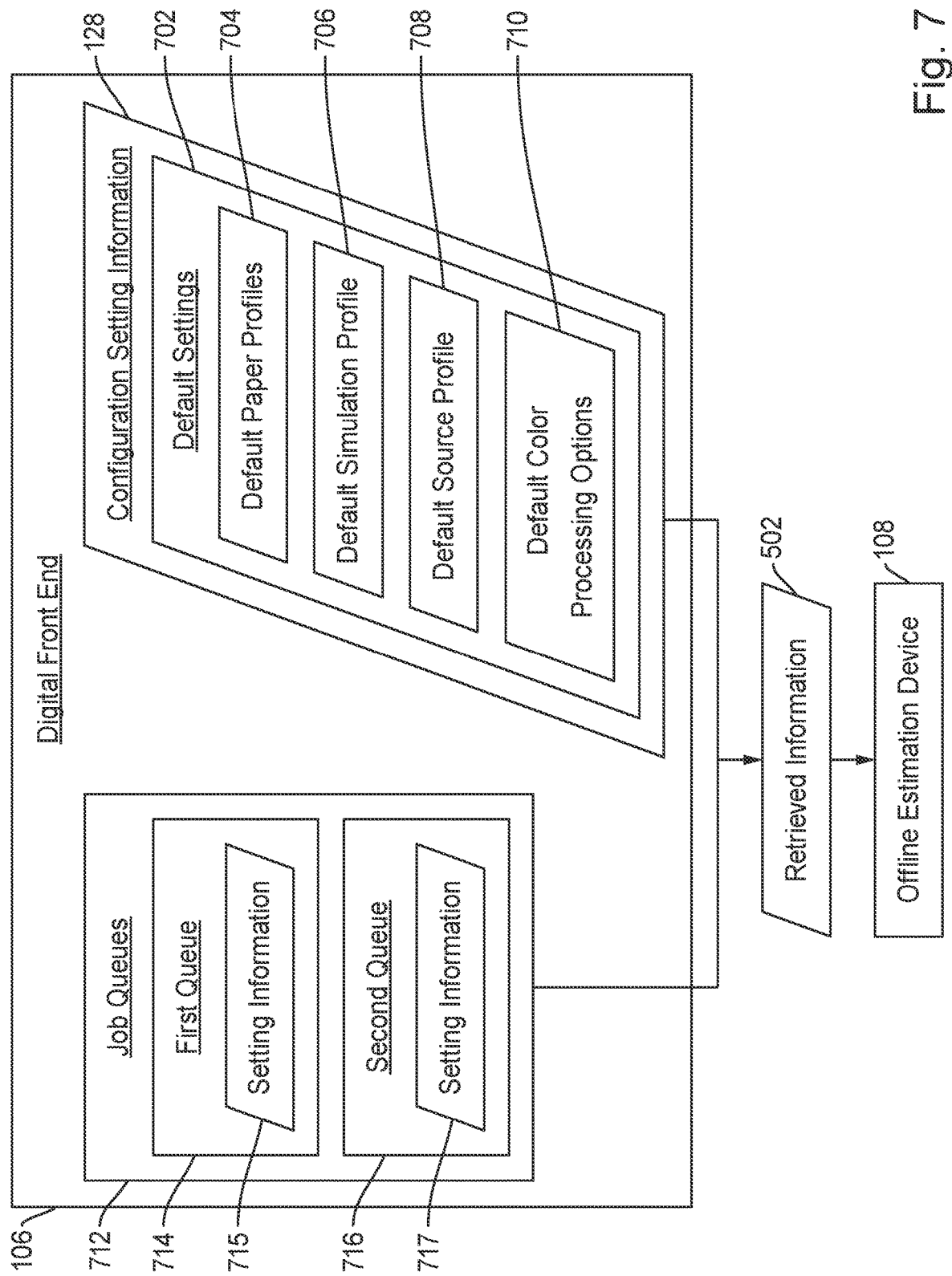
FIG. 7 illustrates a block diagram of additional settings for use in estimating consumables for printing operations using the offline estimation device according to the disclosed embodiments.

FIG. 7 depicts a block diagram of additional settings for use in estimating consumables for printing operations using offline estimation device 108 according to the disclosed embodiments. FIG. 7 includes additional features to configuration setting information 128 that may be used in configuring selected RIP 406 as disclosed above. Further, DFE 106 includes job queues 712 that "queue" print jobs for processing and printing at printing device 104. Information or settings regarding the job queues also may be used in providing ink use estimates according to the disclosed embodiments.

DFE 106 may include default settings 702 for printing device 104. Default settings 702 may be used by printing device 104 when nothing is explicitly specified for a print job. These settings may be used in place of other configuration settings disclosed above, such as margins 504. For example, printing device 104 may include default paper profiles 704, default simulation profile 706, and default source profile 708. Default paper profiles 704 may include three different default paper profiles. These profiles may be used for printing operations within DFE 106. Alternatively, printing device 104 may include a single default paper profile 704. It also may allow an operator to change default profiles.

Default settings 702 may be applicable to consumable estimation as they are applied in some situations during printing operations. Further, as they may be changed at printing device 104, it is important that those changes are captured for the printing device at the time that an estimate is being generated. RIP firmware 290 may rely on default settings 702 in printing documents. Thus, selected RIP 406 should be configured to do the same and have access to the default settings offline, and without the need to query printing device 104 after an estimate has begun.

Default settings 702 also include default color processing options 710. For color printing, DFE 106 and printing device 104 may institute default operations to process the print job and make it available for color printing. As noted above, color printing resources 130 are provided to offline estimation device 108. Default color processing options 710 may disable or enable various options by default in the event these options are not specified for print job 103. For example, black point compensation (BPC) may be enabled or disabled by default. If print job 103 does not specify BPC then the default setting is used. Another example is default color settings under default color processing options 710 that limit ink use or substitute certain color printing operations for others in order to save ink or toner.

Default settings 702 may be specified on a global basis within printing device 104. Alternatively, default settings 702 may be specified on a queue basis. DFE 106 may include more than one job queue 712. For example, first queue 714 and second queue 716 may be implemented for print jobs received at printing device 104 and held within DFE, 106. First queue 714 may be for monochrome, or non-color, print jobs. Second queue 716 may be for color print jobs. Thus, each queue may have different default settings applicable to printing operations for its print jobs.

Using the above examples, a default option for the BPC for first queue 714 may be set in default color processing options 710 of setting information 715. A default option for the BPC also may be set for second queue 716 in default color processing options 710 of setting information 717, which is different than the one in setting information 715. The operator may select which queue to use in printing operations. Using another example, print jobs in first queue 714 may take priority over print jobs in second queue 716, or may be subject to a higher quality of print job. Thus, configuration and default settings for the queues may differ. Setting information 715 may capture this specific information for first queue 714 and setting information 717 may capture this information for second queue 716. This information should be provided for configuring selected RIP 406, as print job 103 may sent to a specific queue within DFE 106.

Default settings 702, setting information 715 for first queue 714, and setting information 717 for second queue 716 is included with the other configuration settings in configuration setting information 128 within retrieved information 502 provided to offline estimation device 108. Selected RIP 406 is configured with these settings, options, and information to better match RIP firmware 290 of DFE 106.

Referring back to flowchart 600, steps 608 may include retrieving default settings 702 and setting information 715 and 717. These may be included with configuration setting information 128 and used to configure selected RIP 406 in step 612. In other embodiments, default settings 702 may be used to fill in those configuration and printing device settings not explicitly specified in configuration setting information 702.

Using setting information 715 and 717 for the different queues, default color processing options may be applied as well. Selected RIP 406 may be configured to process print jobs according to the job queue assigned to hold the print job. As noted above, setting information may differ between the different job queues implemented within DFE 106. This information is provided to offline estimation device 108 to better match printing operations in printing device 104.

Figure 8:
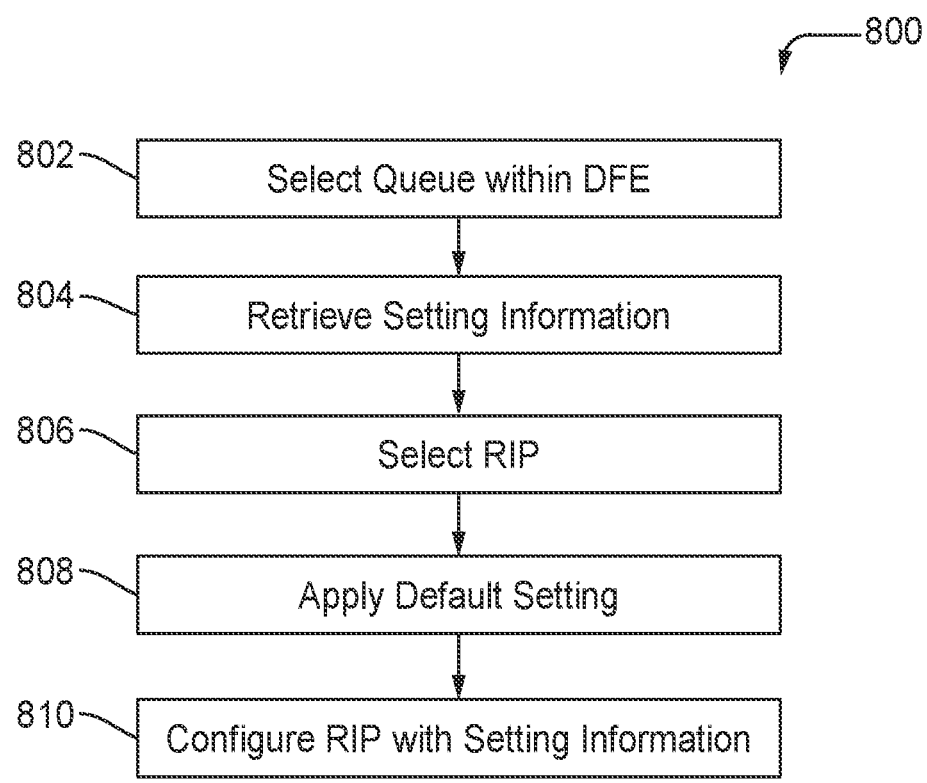
FIG. 8 illustrates a flowchart for estimating use of consumables based on a selected queue according to the disclosed embodiments.

FIG. 8 depicts a flowchart 800 for estimating use of consumables 132 based on a selected queue according to the disclosed embodiments. Flowchart 800 may refer to FIGS. 1A-7 for illustrative purposes. Flowchart 800, however, is not limited to the embodiments disclosed by FIGS. 1A-7.

Flowchart 800 may incorporate steps 602-606 in receiving print job 103, selecting target printing device 104, and sending a query from offline estimation device 108. Further, DFE version information 126 is retrieved as well in step 608. Configuration setting information 128 also may be retrieved along with the additional features disclosed below.

Step 802 executes by selecting a queue within job queues 712 of DFE 106. The operator may select a queue to process print job 103. The different queues may operate and process print jobs differently. Further, one job queue may have priority over another job queue. In this instance, first queue 714 may be selected to receive print job 103. Step 804 executes by retrieving setting information 715 for first queue 714. Setting information 715 may include default settings 702 for print jobs within first queue 714.

Step 806 executes by selecting RIP 406 from plurality of RIPs 124, as disclosed above in step 610. Step 808 executes by applying any default settings 702 to configure the RIP. For example, default color processing options 710 may include a default color processing setting to apply for print jobs in first queue 714. Step 810 executes by configuring selected RIP 406 with setting information 715 of the selected queue to receive print job 103. The configuration may include using the default setting as well. Flowchart 800 may incorporate steps 614-618 to generate the estimate for consumable use for print job 103.

Figure 9:
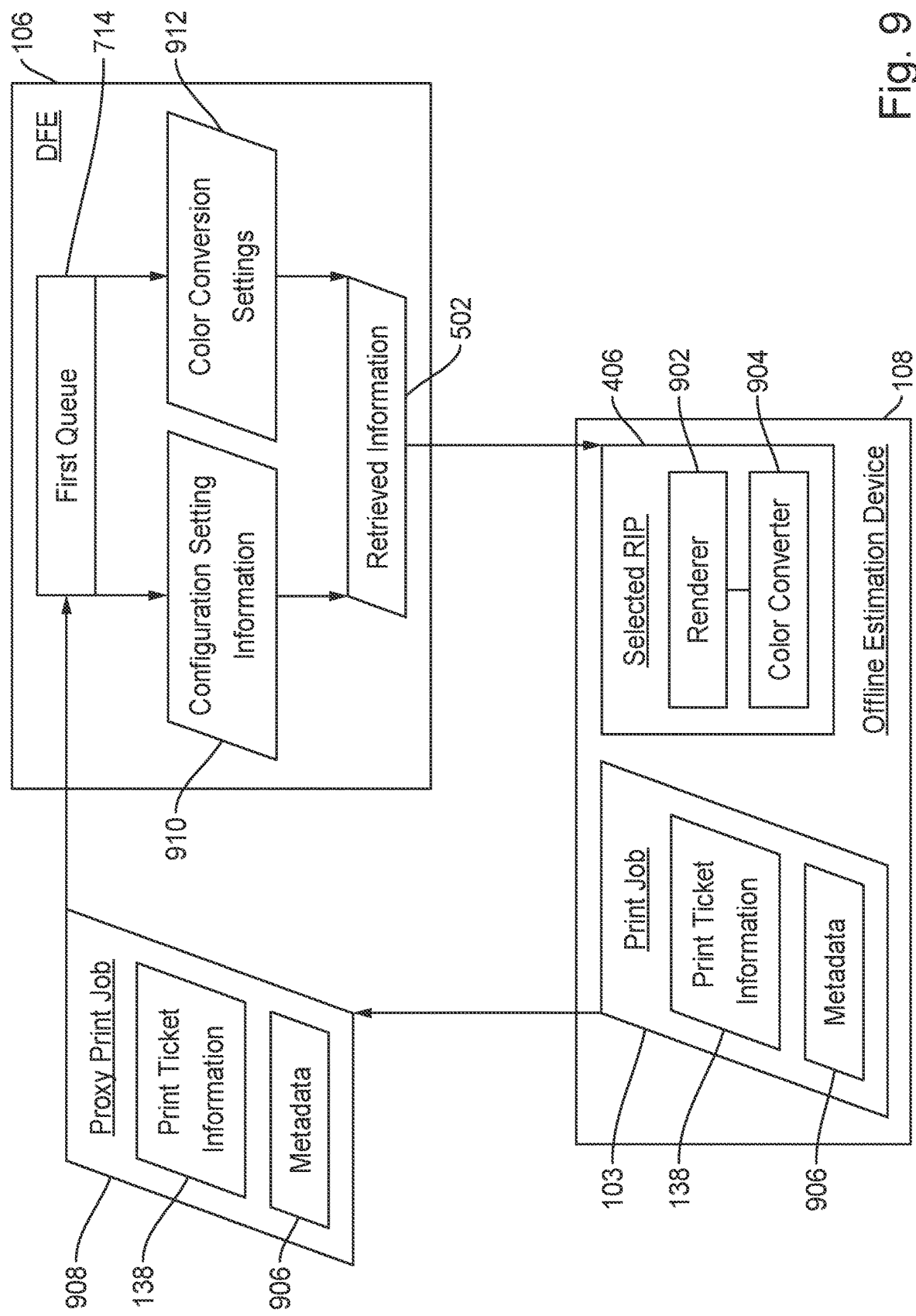
FIG. 9 illustrates a block diagram of estimating consumables using a proxy print job to generate settings within the DFE according to the disclosed embodiments.

FIG. 9 depicts a block diagram of estimating consumables using a proxy print job 908 to generate settings within DFE 106 according to the disclosed embodiments. In some embodiments, selected RIP 406 may include two core components that are subject to the configuration as disclosed above. In other words, plurality of RIPs 124 may include shared core components that do not change substantially between RIP versions. Offline estimation device 108 may store the common core components to be used between a number of RIP versions as opposed to redundantly storing the core components for each version. Offline estimation device 108 may retrieve the core component when doing estimation operations as part of whichever RIP is selected.

These common core components match those found in the RIPs being implemented on one or more printing devices. For example, renderer 902 and color converter 904 may be core components for RIPs at offline estimation device 108. For printing operations, these components act as renderer 308 and color converter 316 of RIP firmware 290. As they are located at offline estimation device 108, these components are noted as different. Thus, rather than have a different version of the RIP for every engine model and every version within that engine model, the disclosed embodiments would have different versions of the RIP based on the core RIP software versions and based on the color management library versions.

Offline estimation device 108 would select the matching version of DFE 106 based on what print engine 260 uses. It, however, would not look at the overall version of the DFE but, instead, it would look at the version of the two core components. For example, DFE 106 may provide information on renderer 308 to offline estimation device to identify renderer 902, which may be common to a number of RIPs within plurality of RIPs 124. It also may identify color converter 904 based on color converter 316. For example, there may only be one version applicable to renderer 902 but several versions applicable to color converter 904. In some embodiments, only renderer 902 is identified from the information from DFE 106.

When ink estimation is requested, offline estimation device generates a special job to printing device 104. This special job may be proxy print job 908, which is generated at offline estimation device 108 and not from client terminal 102 or printing device 104. Proxy print job 908 includes print ticket information 138 for print job 103 that is the subject of the estimate. Further, proxy print job 908 includes metadata 906 about the job file of print job 103. Metadata 906, for example, may include file dimensions and output intent embedded in the job file, such as a PDF.

Preferably, proxy print job 908 does not include the job file for print job 103. Thus, proxy print job 908 should not be a large file compared to normal print jobs received at printing device 104. Proxy print job 908 is received by DFE 106. DFB 106 processes proxy print job 908 to determine how the job would be processed if it was submitted to printing device 104. In some embodiments, first queue 714 may be specified to receive print job 103. Thus, proxy print job 908 is placed in first queue 714 accordingly.

DFE 106 would determine model-specific settings to print a document for print job 103 using proxy print job 908. For example, it may determine margins 504 are limited to specified sizes on printing device 104. Margins 504 may differ between printing devices as well so that each printing device should be queried as to how its settings impact printing operations and use of consumables 132. In addition, DFB 106 would go through the logic flow that is used to determine color conversion settings 912 to be used for print job 103. In some embodiments, the exact color conversion settings are determined.

Because there is no actual "job file" for proxy print job 908, the processing should be very quick, or at least faster than processing print job 103. DFE 106 determines configuration setting information 910 and color conversion settings 912 that should be used to actually process print job 103 at printing device 104. These items are included in retrieved information 502, which is sent to offline estimation device 108. These settings may differ from configuration setting information 128 and color printing resources 130 disclosed above as they are generated upon request, or receipt of proxy print job 908. They are not necessarily stored at DFE 106 for later use.

Configuration setting information 910 and color conversion settings 912 are used by offline estimation device 108 to configure selected RIP 406 as disclosed above. The benefit of the disclosed process is that the number of different RIP instances may be reduced within offline estimation device 108. In addition, the offline estimation device 108 does not need to duplicate the logic used to determine exactly how to perform color conversion. DFE 106 executes this logic and returns the output to offline estimation device 108. Thus, these embodiments may make offline estimation device 108 more efficient.

Figure 10:
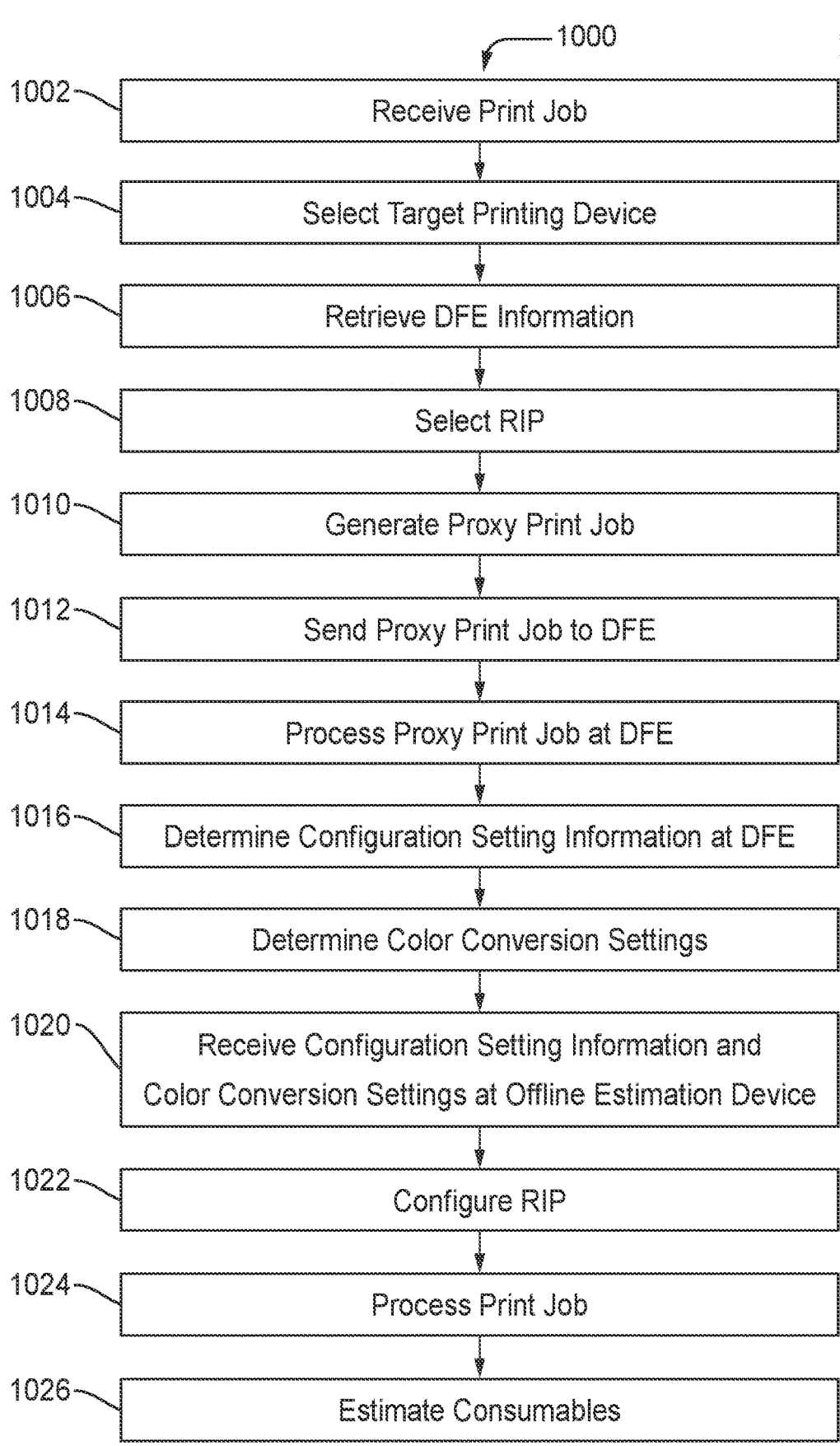
FIG. 10 illustrates a flowchart for using the proxy print job by the offline estimation device according to the disclosed embodiments.

FIG. 10 depicts a flowchart 1000 for using proxy print job 908 by offline estimation device 108 according to the disclosed embodiments. Flowchart 1000 may refer to FIGS. 1A-9 for illustrative purposes. Flowchart 1000, however, is not limited to the embodiment disclosed by FIGS. 1A-9.

Step 1002 executes by receiving print job 103, preferably, at offline estimation device 108. This step is similar to step 602 disclosed above. Step 1004 executes by selecting target printing device 104. This step is similar to step 604 disclosed above. Step 1006 executes by retrieving DFE version information 126. A request is sent to DFE 106 of printing device 104. It should be noted that configuration setting information 128 and color printing resources 130 are not retrieved. Step 1008 executes by selecting RIP 406 from the plurality of RIPs 124 using DFE version information 126. Selected RIP 406 may include core components, such as renderer 902 and color converter 904.

Step 1010 executes by generating proxy print job 908. As disclosed above, proxy print job 908 corresponds to print job 103. Proxy print job 908 may include print ticket information 138 and metadata 906 submitted with print job 103. Step 1012 executes by sending proxy print job 908 to DFE 106 of printing device 104 from offline estimation device 108. A job queue, such as first queue 714, may be specified to receive proxy print job 908.

Step 1014 executes by processing proxy print job 908 at DFE 106. DFE 106 processes proxy print job 908 to determine how print job 103 would be processed if it is submitted to printing device 104. As disclosed above, configuration settings for printing device 104 are determined that are needed to "print" proxy print job 908. DFE 106 goes through the logic flow for preparing proxy print job 908, acting as print job 103, to be printed.

Step 1016 executes by determining configuration setting information 910 for proxy print job 908 at DFE 106. The configuration settings for information 910 are generated and determined at this point and not when DFE version information 126 is retrieved. Step 1018 executes by determining color conversion settings 912 that would be used for print job 103 using the information provided by proxy print job 908.

Step 1020 executes by receiving configuration setting information 910 and color conversion settings 912 at offline estimation device 108 from DFE 106. Step 1022 executes by configuring selected RIP 406 with the received information and settings, as disclosed above. Step 1024 executes by processing print job 103. Step 1024 is similar to step 616 disclosed above. Step 1026 executes by estimating consumables 132 to print document 105 for print job 103. Step 1026 is similar to step 618 disclosed above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for estimating use of consumables for printing operations, the method comprising:
    selecting a target printing device to receive a print job;
    retrieving digital front end (DFE) information from the target printing device;
    selecting a raster image processor (RIP) from a plurality of RIPs at an offline estimation device based on the DFE information from the target printing device, wherein the RIP includes a rendering component and a color conversion component;
    sending a proxy print job to the DFE, wherein the proxy print job corresponds to the print job;
    requesting configuration setting information and color conversion settings from the DFE based on the print job;
    receiving the configuration setting information and the color conversion settings at the offline estimation device;
    configuring the rendering component of the RIP with the configuration setting information and applying the color conversion settings to the color conversion component; and
    estimating an amount of consumables for the print job using the selected RIP.

2. The method of claim 1, wherein the DFE information includes print engine model information.

3. The method of claim 1, wherein the proxy print job includes print ticket information for the print job.

4. The method of claim 1, wherein the proxy print job includes metadata for the print job.

5. The method of claim 1, further comprising processing the proxy print job at the DFE to determine the configuration setting information and the color conversion settings.

6. The method of claim 5, further comprising determining a default setting for the configuration setting information.

7. The method of claim 1, further comprising specifying a queue within the DFE to process the proxy print job.

8. A method for estimating consumables for printing operations, the method comprising:
    selecting a target printing device to receive a print job;
    retrieving digital front end (DFE) information from the target printing device;
    selecting a raster image processor (RIP) from a plurality of RIPs at an offline estimation device based on the DFE information from the target printing device;
    sending a proxy print job to the DFE, wherein the proxy print job includes print ticket information for the print job;
    processing the sent proxy print job at the DFE to determine configuration setting information and color conversion settings for the proxy print job;
    receiving the configuration setting information and the color conversion settings at the offline estimation device;
    configuring the selected RIP with the configuration setting information and the color conversion settings; and
    estimating an amount of consumables for the print job using the selected RIP.

9. The method of claim 8, wherein the DFE information includes print engine model information.

10. The method of claim 8, wherein the plurality of RIPs includes a common rendering component.

11. The method of claim 10, wherein the rendering component is configured with the configuration setting information.

12. The method of claim 8, further comprising determining a default setting for the configuration setting information.

13. The method of claim 8, further comprising specifying a queue within the DFE to process the proxy print job.

14. A consumable estimation system for printing operations, the system comprising:
    a digital front end (DFE) of a target printing device, wherein the DFE includes DFE information,
    the DFE configured to
        receive a proxy print job, and
        generate configuration setting information and color conversion settings for the proxy print job; and
    an offline estimation device connected to the DFE, wherein the offline estimation device receives a print job for the target printing device,
    the offline estimation device is configured to
        select a raster image processor (RIP) from a plurality of RIPs available to the DFE of the target printing device,
        send the proxy print job corresponding to the print job to the DFE,
        receive the configuration setting information and the color conversion settings for the sent proxy print job from the DFE,
        configure the selected RIP with the configuration setting information and the color conversion settings, and
        estimate an amount of consumables for the print job using the selected RIP and the color conversion settings.

15. The consumable estimation system of claim 14, wherein the DFE includes a plurality of job queues.

16. The consumable estimation system of claim 15, wherein the offline estimation device specifies that the proxy print job be placed in a job queue of the plurality of job queues.

17. The consumable estimation system of claim 16, wherein the configuration setting information includes setting information for the job queue.

18. The consumable estimation system of claim 14, wherein the DFE information includes print engine model information.

19. The consumable estimation system of claim 14, wherein the offline estimation device is a server.

* * * * *